Sept. 21, 1926.  G. VENOSTA  1,600,914

MOLD FOR TIRE COVERS

Filed Oct. 16, 1925

Inventor.
Giuseppe Venosta
By [signature]
Attorney

Patented Sept. 21, 1926.

1,600,914

UNITED STATES PATENT OFFICE.

GIUSEPPE VENOSTA, OF MILAN, ITALY.

MOLD FOR TIRE COVERS.

Application filed October 16, 1925, Serial No. 62,767, and in Italy October 27, 1924.

It is well known that there are numerous advantages in using steel molds rather than cast-iron molds in the stamping and vulcanizing of the covers of pneumatic tires for motor vehicles and the like.

The said molds have in fact to resist considerable strains, exercised upon them by the autoclave press used during the molding operation, the necessary resistance being obtained in steel molds with much less thickness of metal than in cast-iron molds.

The weight of the steel molds is therefore considerably reduced and consequently they are much more easily handled and also the expenditure of heat required to bring the molds to the vulcanization temperature is less.

The output of the autoclave is increased, for the dimensions of the molds being smaller it can hold a larger number of molds.

The life of a cast-iron mold is often limited by fractures caused by some sudden strain or shock, such fractures frequently occurring with cast-iron molds, while the strains of the kind in question have to be considerably greater to fracture a steel mold. This being so, the steel molds have to be of solid and economical construction, and they should not be of cast steel, for cast steel is open to objection because of the flaws which often occur therein. These flaws make it very difficult to obtain absolute continuity and perfect machining of the surface of the mold which is to come in contact with the surface of the tire or cover. These conditions are essential for obtaining a good product. By employing forged or rolled steel in place of cast steel, however, it is possible to make use of special steel having a particularly high strength, so that the dimensions may be still further reduced and the molds may be made even lighter than cast steel molds.

The problem set out above is solved by the present invention, according to which a steel mold is constructed in what is known as box form.

Figure 1:
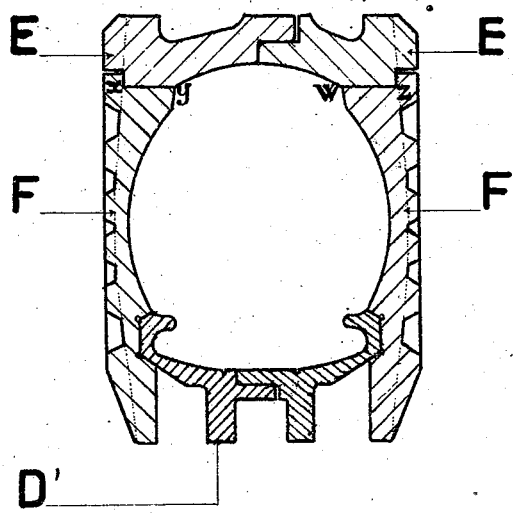
Figure 2:
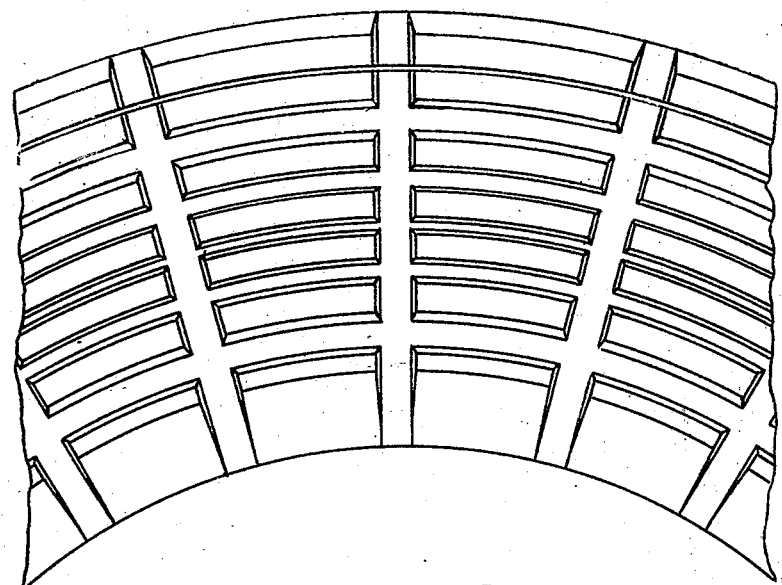

The accompanying drawing shows one such mold by way of example, Figure 1 being a cross-section thereof, and Fig. 2 a fragmental plan view.

In the construction illustrated, the mold is formed by assembling two parallel side members F, F, which are almost flat and are of annualr form; one constituting the upper plate of the mold and the other the lower plate. These side members or cheeks are held at the required distance apart by outer and inner ring members which are structurally separate therefrom and which correspond, respectively, to the tread of the tire cover and to the inner or rim side thereof which carries the beads for engaging the rim. The latter side, designated D' in the drawing, will be formed in two parts, in case it is to be used for making covers which have non-rigid beads, so as to facilitate the insertion of the cover in the mold and its removal; and two parts will have to be turned in at their inner edges so as to form, with the space within the mold when assembled, the profile which it is desired to give the beads.

The outer or tread-forming ring is likewise made in two parts, designated E, E, which are permanently secured to the adjacent cheeks F, F; a strong and effective joint being formed, for example, by heating the ring members and shrinking them onto the cheeks, the contacting surfaces being indicated at $x$—$y$ and $w$—$z$ in Fig. 1.

The several parts fit together so as to assure the precise and correct position with regard to one another of all the parts of the mold. During the molding operation, the mold as will be seen, is held together by the pressure exercised on it by the plates of the press.

The different parts of the mold described have a form which allows them to be made of forged or rolled steel very economically. The construction of a forged steel mold is made possible from the economical standpoint not only because the mold is made up of a number of elements but because each element consists of a ring, the section of which differs but little from a single rectangle. By making use therefore of forged or rolled rings, which can only be constructed easily if they are substantially rectangular in section, it is possible to make the improved mold without waste of material.

Furthermore, the mold may be constructed in nickel, steel or chrome steel which have very great strength and the molds may be still further reduced in thickness.

Having now particularly described and ascertained the nature of my said invention, and in what manner the same is to be performed, I declare that what I claim is:

1. A mold for molding and pressing pneumatic tire covers comprising two substantially flat annular members adapted to form the sides of the mold, ring shaped spacing means structurally separate from said sides adapted to be pressed together by the same and to form the tread portion of the mold, and ring shaped spacing means adapted to be pressed together by the said sides and to form the inner edge portion of the mold, all the parts of the mold being of forged steel.

2. A mold for molding and pressing pneumatic tire covers comprising two substantially flat annular members adapted to form the sides of the mold, ring shaped spacing means in two parts structurally separate from said sides adapted to be pressed together by the same and to form the tread portion of the mold, and ring shaped spacing means in two parts adapted to be pressed together by the said sides and to form the inner edge portion of the mold, all parts of the mold being of forged steel.

3. A mold for molding and pressing pneumatic tire covers, comprising two substantially flat annular members adapted to form the sides of the mold, ring-shaped spacing means in two parts structurally separate from said sides adapted to be pressed together by the same and to form the tread portion of the mold, each of said spacing parts being shrunk on the adjacent side member of the mold, and ring-shaped spacing means adapted to be pressed together by the said sides and to form the inner edge portion of the mold, all parts of the mold being of forged steel.

In testimony whereof I affix my signature.

GIUSEPPE VENOSTA.